UNITED STATES PATENT OFFICE.

HANS ARNOLD, OF CHARLOTTENBURG, GERMANY, ASSIGNOR TO THE FIRM OF DR. O. KNÖFLER & CO., OF PLOTZENSEE, NEAR BERLIN, GERMANY.

METHOD FOR MANUFACTURING UTENSILS AND THE LIKE FROM THE OXIDS OF THE RARE EARTHS, THORIUM OXID, ZIRCONIUM OXID, AND THE LIKE.

1,121,889.  Specification of Letters Patent.  Patented Dec. 22, 1914.

No Drawing.  Application filed December 20, 1913.  Serial No. 808,013.

*To all whom it may concern:*

Be it known that I, HANS ARNOLD, a subject of the German Emperor, residing at Charlottenburg, in the Empire of Germany, have invented certain new and useful Improvements in Methods for Manufacturing Utensils and the like from the Oxids of the Rare Earths, Thorium Oxid, Zirconium Oxid, and the like, of which the following is a specification.

It is known that thorium oxid, zirconium oxid, and the oxids of the rare earths, have a considerably higher fusing point than have china or clay-mixtures, quartz, aluminium oxid, and similar known mixtures and substances employed for the manufacture of vessels and implements. Owing to that fact, various trials have been made to employ the oxids of the rare earths, especially the zirconium oxid and the thorium oxid, for the article or articles in question. No practical result has, however, hitherto been attained because the endeavors to work the pure oxid without the addition of other substances or cementing media (whereby the fusing point of the composition is considerably lowered) failed.

Generally, the oxids in question, together with a cementing medium, have been turned into a paste. Weiss, who examined the conditions particularly with respect to zirconium oxid (*Zeitschrift für Anorganische Chemie*, vol. 65) found that an addition of 10% of magnesia was necessary to produce crucibles that were able to stand burning. The zirconium crucibles existing in commerce also contain a large percentage of other components, which serve as cementing media and do not volatilize during the burning operation. These additions or, in fact, impurities lower, however, greatly, as already mentioned, the fusing point of the vessels or crucibles, so that these latter can only stand a temperature of about 2000° C., whereas it is desirable that such vessels should be able to resist far higher temperatures without fusion.

It has now been found that a highly refractory mass which is very well adapted for the manufacture of vessels by reason of its inherent plasticity may be obtained by making use of the pure oxids, without any addition of another substance, except water. If the vessels or implements are shaped in the usual manner by molding or casting and the articles thus produced are then burned, it will be found that the shrinkage is very irregular and the articles are so porous and their strength is so slight that they cannot practically be used. For example, it is not possible to glaze a vessel thus obtained after the burning since the molten glaze is absorbed similarly as by a sponge and the glazing must be repeated four or five times before a glazed coating is obtained. The material of the vessel or crucible is obviously rendered greatly impure in this way, with the result that by the lowering of the fusing point the vessels becomes useless for very high temperatures. Experiments have shown that this deficiency may be obviated by shaping the mass not by casting but by pressing. By this means the mass is rendered from the beginning so dense that the glaze cannot penetrate into it, but the first coating already remains upon the surface and the mass remains therefore pure. Thus, according to the present invention, the oxids of the rare earths, thorium oxid or zirconium oxid, without any additional substance, except water, which cannot be regarded as a cementing medium because it completely evaporates during the process, are subjected to pressure in suitable molds and are thus shaped as desired, the particles of the oxid or mass being connected with each other by the pressure, in connection with the inherent plasticity of the oxids in question. The vessels are then burned in a known kiln at a temperature of about 1600–1800° C. and so get the necessary hardness; they exhibit no cracks and no fissures, but consist of a uniform coherent compact mass of remarkable strength. The shrinkage occurring during the burning ceases at about 1800–1900° C.

The gist of the invention resides thus not solely in the employment of pure oxids alone or solely in subjecting the oxid or oxids to pressure, but it resides in the combination of these two steps, it being understood that no additional substance is applied. The vessels obtained by the method in question are able to stand long-lasting heating even to more than 3000° C. without fusing. Such vessels have been entirely unknown up to the present. Of course, also a mixture of thorium oxid and zirconium oxid may be employed, as well as a mixture of one or the other or both said oxids with an oxid of another, or oxids of other rare earths.

In a variety of cases it is desirable to have vessels which not only resist the high temperatures mentioned but are, moreover, impervious to fluxes and gases. Such crucibles are required for instance for reducing and melting metals, viz: for keeping off, on one side, oxidizing gases, and on the other side, for keeping off carbonaceous gases which might render the metal impure by the formation of carbid or render it useless in another way, as would occur, for instance, with platinum.

Concerning the glazing of the vessels, it is obvious, that the fusing temperature of the glaze must be lower than that of the material of the vessel. It is known that small quantities of impurities lower the fusing point of the oxids considerably; in view of this, the glazing mass may receive an addition or additions of substances, such as titanium dioxid, aluminium oxid, silicic acid, and the like, in a definite quantity, or impure zirconium oxid may be employed from the beginning. By varying these additions and their quantities, mixtures with rising fusing points, corresponding to Seger's fusing cones, may be produced, and the glaze may be so chosen that its fusing point lies a few hundred degrees over the highest temperature which the vessel or crucible will be exposed to in actual use. The mixture selected is turned into a thick paste by means of alcohol and the implements or utensils are coated with this paste. The coated article is then carefully dried and after this preliminarily burned at a temperature of about 800° C., whereby the coating or glaze receives the necessary strength. Then the temperature is raised until the glaze is in melting condition. According as acid or alkaline fluxes are employed in the preparation of the glaze, the utensils or implements may be used also for rendering soluble ores of very different kinds by acid or basic substances. The articles coated with such glazes are, even in the highest temperatures, non-conductors or very bad conductors of electricity. This is of very great practical importance. The highest temperatures beyond 2000° C. can be produced solely by electric heating. Generally, a crucible of carbon inserted into the secondary circuit of a transformer is used. If impure oxids be employed as material for the formation of the crucible, this latter would become a conductor on being heated, the current would pass through the metal to be melted, the sectional area would become larger, the resistance less and the temperature would become lower. But owing to the present invention, in general and the glazes in question in particular, it is possible to render the crucible impervious without allowing it to become an electric conductor. Experiments have proved that it is possible to work for several hours running at temperatures over 3000° C., a result, that has generally been considered impossible up to the present. The possibility of manufacturing vessels and other utensils that may be regarded as practically perfectly refractory opens up new ways for carrying out many operations on a large scale, which could not hitherto be carried through.

Having now described my invention, what I desire to secure by a patent of the United States is:—

1. The herein described method of manufacturing refractory utensils, which consists in forming a mixture consisting solely of the oxid of a rare earth and a completely vaporizable medium capable of converting said oxid into a paste, subjecting said mixture to pressure to shape the same, and thereafter burning the resulting product.

2. The herein described method of manufacturing refractory utensils, which consists in forming a mixture containing solely the oxid of a rare earth and water, subjecting said mixture to pressure in a mold, whereby said mixture is shaped, and thereafter burning the resulting product.

3. The herein described method of manufacturing refractory utensils, which consists in subjecting a mixture consisting solely of zirconium oxid and water to pressure in a mold, whereby said mixture is shaped, and thereafter burning the resulting product.

4. The method of manufacturing refractory utensils from the oxids of the rare earths, thorium oxid and zirconium oxid, consisting in coating the utensils with a glaze composed of thorium oxid, zirconium oxid, and an additional oxid, the quantity of said additional oxid being made dependent upon the fusing point of the utensil to be produced, substantially and for the purpose as described.

5. The method of manufacturing refractory utensils from the oxids of the rare earths, thorium oxid and zirconium oxid, consisting in subjecting the oxids or their mixture to pressure in a mold, without any addition of other substances, such as a cementing medium or the like, except water, coating the thus shaped utensils with a glaze composed of thorium oxid, zirconium oxid, and additional oxid, the quantity of said additional oxid being made dependent upon the fusing point of the utensil to be produced, and burning the thus shaped and glazed utensils, substantially and for the purpose as described.

In testimony whereof I affix my signature in presence of two witnesses.

HANS ARNOLD.

Witnesses:
 WOLDEMAR HAUPT,
 HENRY HASPER.